United States Patent [19]
Shimura

[11] Patent Number: 5,644,620
[45] Date of Patent: Jul. 1, 1997

[54] METHOD OF INDICATING A PORTABLE UNIT OF A CORDLESS TELEPHONE INSTRUMENT OUT OF OPERATIONAL AREA AND ITS DEVICE

[75] Inventor: Yukihiro Shimura, Tokyo, Japan

[73] Assignee: NEC Corporation, Tokyo, Japan

[21] Appl. No.: 451,677

[22] Filed: May 26, 1995

[30] Foreign Application Priority Data

Jun. 30, 1994 [JP] Japan .................................. 6-171720

[51] Int. Cl.⁶ .............................. H04M 1/24; H04M 3/22; H04M 11/00; H04Q 7/00
[52] U.S. Cl. ............................... 455/421; 379/1; 379/27; 379/29; 379/32; 379/33; 455/38.1; 455/462
[58] Field of Search ............................. 379/1, 32, 33, 379/34, 58, 61, 22, 24, 27, 29, 30; 455/54.1, 54.2, 33.1, 56.1, 229, 38.1

[56] References Cited

U.S. PATENT DOCUMENTS

| | | | |
|---|---|---|---|
| 4,853,951 | 8/1989 | Bauer | 379/62 |
| 4,930,149 | 5/1990 | Matsushima | 379/58 |
| 4,939,766 | 7/1990 | Umemoto | 379/61 |
| 4,996,715 | 2/1991 | Marui | 455/54.1 |
| 5,086,507 | 2/1992 | Mela | 455/54.1 |
| 5,373,548 | 12/1994 | McCarthy | 379/58 |

FOREIGN PATENT DOCUMENTS

| | | |
|---|---|---|
| 0 586 906 A2 | 3/1994 | European Pat. Off. . |
| 3-13040 | 1/1991 | Japan . |
| 3-114338 | 5/1991 | Japan . |
| 3-114339 | 5/1991 | Japan . |
| 2 258 789 | 2/1993 | United Kingdom . |
| 2 257 332 | 6/1993 | United Kingdom . |

OTHER PUBLICATIONS

Patent Abstracts of Japan, vol. 014, No. 145 (E-0905), 19 Mar. 1990 & JP-A-02 007731 (Sharp Corp.).

*Primary Examiner*—Curtis Kuntz
*Assistant Examiner*—Vijay Shankar
*Attorney, Agent, or Firm*—Scully, Scott, Murphy & Presser

[57] ABSTRACT

A cordless telephone instrument is improved in that, even when a portable unit is not in use, it can be determined and notified to the user whether the portable unit is inside or outside of an operational area of the portable unit. In portable unit 2, portable unit timer 28 counts a predetermined first reference time and outputs a time-out signal for each first reference time. Every time the time-out signal is outputted, a registration signal is transmitted from portable unit radio circuit 21 toward a fixed unit. When the registration signal is received by fixed unit radio section 12, fixed unit 1 transmits a response signal toward portable unit 2. Portable unit 2 continuously operates to receive a response signal. However, when no response signal is detected within a counting time of portable unit timer 28, operational area out alarm generation section 27 is activated under the control of portable unit control circuit 24 to perform an operation of notifying that portable unit 2 is outside of the operational area.

10 Claims, 4 Drawing Sheets

METHOD OF INDICATING A PORTABLE UNIT OF A CORDLESS TELEPHONE INSTRUMENT OUT OF OPERATIONAL AREA AND ITS DEVICE

BACKGROUND OF THE INVENTION

1. Field of the Invention

This invention relates to a telephone instrument, and more particularly to a cordless telephone instrument.

2. Description of the Related Arts

A cordless telephone instrument is constituted from a fixed unit and a portable unit connected to the fixed unit by way of a radio channel. With the cordless telephone instrument, service can be performed between the fixed unit and the portable unit while the portable unit is being moved within an area within which the fixed unit and the portable unit can be connected to allow operation between them through the radio channel, that is, within an operational area. Accordingly, when the portable unit is moved outside the operational area, connection between the fixed unit and the portable unit through the radio channel is disabled and a call through a telephone line by the portable unit becomes disabled. Therefore, in some conventional cordless telephone instruments, an alarm is developed when it is detected during talking that the portable unit has moved out of the operational area, as disclosed in Japanese Patent Application Laid-Open No. Heisei 3-114338 or 3-114339. In some other conventional cordless telephone instruments, if no response is received from a fixed unit when the portable unit tries to originate a call, it is determined that the portable unit is outside the operational area, and an alarm is developed. Further, in some other conventional cordless telephone instruments, if no response is received from a portable unit within a predetermined period of time another more propagative call signal is developed from the fixed unit, as disclosed in Japanese Patent Application Laid-Open No. Heisei 3-13040.

In this manner, various cordless telephone instruments wherein it is displayed by way of an alarm whether the portable unit is positioned within the operational area have conventionally been proposed. However, with the cordless telephone instruments of the type described, since determination whether or not the portable unit is positioned within the operational area is performed during talking or call originating operation or call receiving operation, it is not able to notify to the user whether the telephone service is available when the cordless telephone instrument is in a state of on hook which occupies the major part in normal state. Accordingly, it sometimes occurs that, while the cordless telephone instrument is not in use, the portable unit is carried to a location outside the operational area and cannot originate a call at the location, or since the portable unit is outside the operational area upon reception of a call, the reception of a call is not known to the user, resulting in a miss of the timing to respond. In this manner, when the portable unit should be used, sometimes it actually cannot be used. Consequently, the conventional cordless telephone instruments described above are disadvantageous to enjoy sufficiently the merit of a cordless telephone instrument such that the portable unit can be freely carried and used within a certain area.

SUMMARY OF THE INVENTION

It is an object of the present invention to provide a method of indicating a sign when a portable unit of a cordless telephone instrument moves out of its operational area by way of an alarm even when the cordless telephone instrument is in a state of on hook and a cordless telephone instrument to which the method is applied.

In order to attain the object described above, according to a first aspect of the present invention, there is provided a method of indicating that a portable unit of a cordless telephone instrument which comprises a fixed unit and a portable unit is out of operational area, comprising the steps of:

starting counting of a predetermined first reference time at the portable unit, transmitting a registration signal of a first frequency peculiar to the cordless telephone instrument from the portable unit after lapse of the first reference time and starting next counting of the first reference time by the portable unit;

transmitting, upon reception of the registration signal by a fixed unit, a response signal of a second frequency peculiar to the fixed unit;

resetting, when the portable unit having transmitted the registration signal receives the response signal, the counted value of the first reference time and starting next counting of the first reference time by the portable unit; and outputting, when said portable unit receives no response signal after lapse of more than a predetermined third reference time longer than the first reference time after having transmitted the registration signal, an indication of an unavailable situation on the portable unit.

According to a second aspect of the present invention, there is provided a method of indicating that a portable unit of a cordless telephone instrument which comprise a fixed unit and a portable unit is out of operational area, comprising the steps of:

starting counting of a predetermined first reference time set at the unit for every reset;

counting a second reference time shorter than the first reference time of a portable unit at the fixed unit, transmitting, after lapse of the second reference time, a confirmation signal of a first frequency peculiar to the cordless telephone instrument from the fixed unit toward the portable unit and resetting the counted time at the fixed unit to re-start a next counting of the second reference time;

resetting, when the portable unit receives the confirmation signal, the counting time of the reference first time and starting a next counting of the first reference time; and outputting an indication of an unavailable situation on said portable unit when the portable unit counts up the first time and outputs a time-out signal.

According to a third aspect of the present invention, there is provided a cordless telephone instrument which includes a fixed unit, and a portable unit connected to the fixed unit through a radio channel, comprising:

portable unit timer means provided in the portable unit for counting, every time after the portable unit timer means is reset, a predetermined first reference time and outputting a time-out signal when said portable unit timer means counts up the first reference time;

transmission and reception means provided in the portable unit for transmitting, every time the time-out signal is outputted, a registration signal of a first frequency peculiar to the cordless telephone instrument toward the fixed unit and receiving a response signal from said fixed unit;

means provided in the portable unit for resetting the portable unit timer means when the response signal is received;

means provided in the portable unit for outputting an indication of an unavailable situation on the portable unit when the response signal is not received within the first reference time; and means provided in the fixed unit for sending out, when a registration signal is received from the portable unit, a response signal of a second frequency peculiar to the subscriber toward said portable unit.

Also, the cordless telephone instrument wherein the means for outputting an indication of an unavailable situation is an alarm generation section for outputting an alarming sound, and a display of an alarm indication mark simultaneously, is included in the present invention.

According to a fourth aspect of the present invention, there is provided a cordless telephone instrument which includes a fixed unit, and a portable unit connected to said fixed unit through a radio channel, comprising:

portable unit timer means provided in the portable unit for counting, every time after the portable unit timer means is reset, a predetermined first reference time and outputting a time-out signal when the portable unit timer means counts up the first reference time;

reception means provided in the portable unit for resetting the portable unit timer means when a confirmation signal sent out from the fixed unit is received;

means provided in the portable unit for outputting, when the time-out signal is outputted, an indication of an unavailable situation representing that the portable unit is in a condition disconnected from the fixed unit;

fixed unit timer means provided in the fixed unit for counting a second reference time shorter than the first reference time of the portable unit timer means is reset every time after counting the second reference time and outputs a time-out signal; and transmission means provided in said fixed unit for transmitting a confirmation signal of a second frequency peculiar to the cordless telephone instrument toward said portable unit and resetting the fixed unit timer when the time-out signal is outputted from the fixed unit timer means.

Also the cordless telephone instrument wherein the means for outputting an indication of an unavailable situation is an alarm generation section for outputting an alarming sound, and a display of an alarm display indication mark simultaneously, is included in the present invention.

DESCRIPTION OF THE PREFERRED EMBODIMENTS

Embodiments of the present invention are described below with reference to the drawings.

Figure 1:
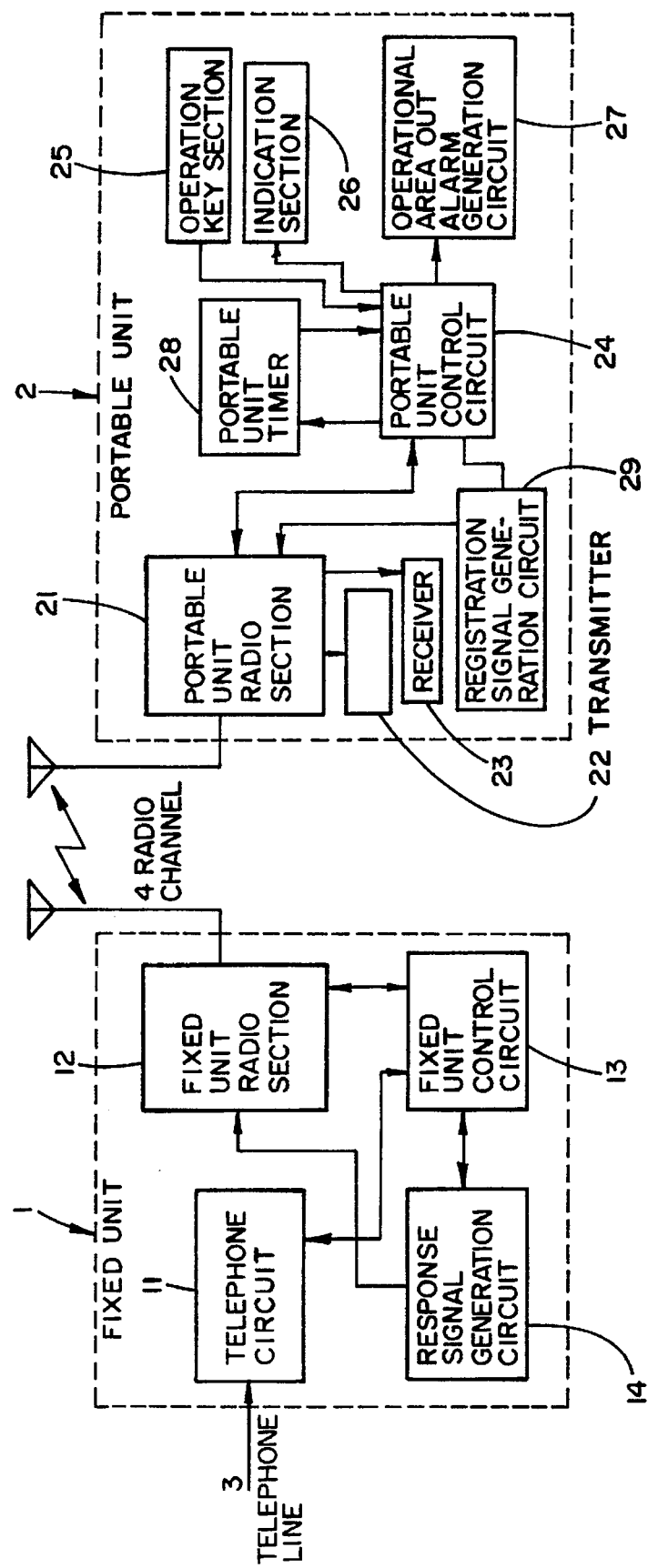
FIG. 1 is a block diagram of a first embodiment of a cordless telephone instrument of the present invention.

FIG. 1 is a block diagram of a first embodiment of a cordless telephone instrument of the present invention.

Fixed unit 1 is installed fixedly at an appropriate location and connected to telephone line 3. Meanwhile, portable unit 2 is formed as a cordless portable unit. Portable unit 2 is moved at any time by its user and is placed at an indefinite location when it is not used. Portable unit 2 is connected to fixed unit 1 through radio channel 4. As a result, portable unit 2 is connected to telephone line 3 by way of fixed unit 1 so that service can be enjoyed. In this instance, radio channel 4 is constituted from a radio section 12 of fixed unit 1 and radio section 21 of portable unit 2, and the transmittable distance of radio waves between fixed unit 1 and portable unit 2 limits the range of movement of portable unit 2.

Fixed unit 1 includes known telephone circuit 11 connected to a telephone line, fixed unit radio circuit 12 for connecting a signal of telephone circuit 11 to portable unit 2 through radio channel 4, response signal generation circuit 14 for generating a response signal of a frequency allocated to the cordless telephone instrument, and fixed unit control circuit 13 for controlling telephone circuit 11, fixed unit radio section 12 and response signal generation circuit 14.

Meanwhile, portable unit 2 includes portable unit radio section 21 for establishing radio connection to fixed unit 1, transmitter 22 and receiver 23 connected to portable unit radio section 21, key section 25 including a switch and a dial which are operated when portable unit 2 is used, indication section 26 for indicating that portable unit 2 is unavailable, operational area out alarm generation section 27 for generating an unavailable condition indicating alarming sound when portable unit 2 has moved out of the operational area, portable unit timer 28 for counting a predetermined time every time after it is reset, registration signal generation circuit 29 for generating a registration signal of the peculiar frequency allocated to the cordless telephone instrument, and portable unit control circuit 24.

Operation of the first embodiment having the construction described above for determining that the portable unit is out of the operational area while the cordless telephone instrument is in a state of on hook is described.

Figure 3:
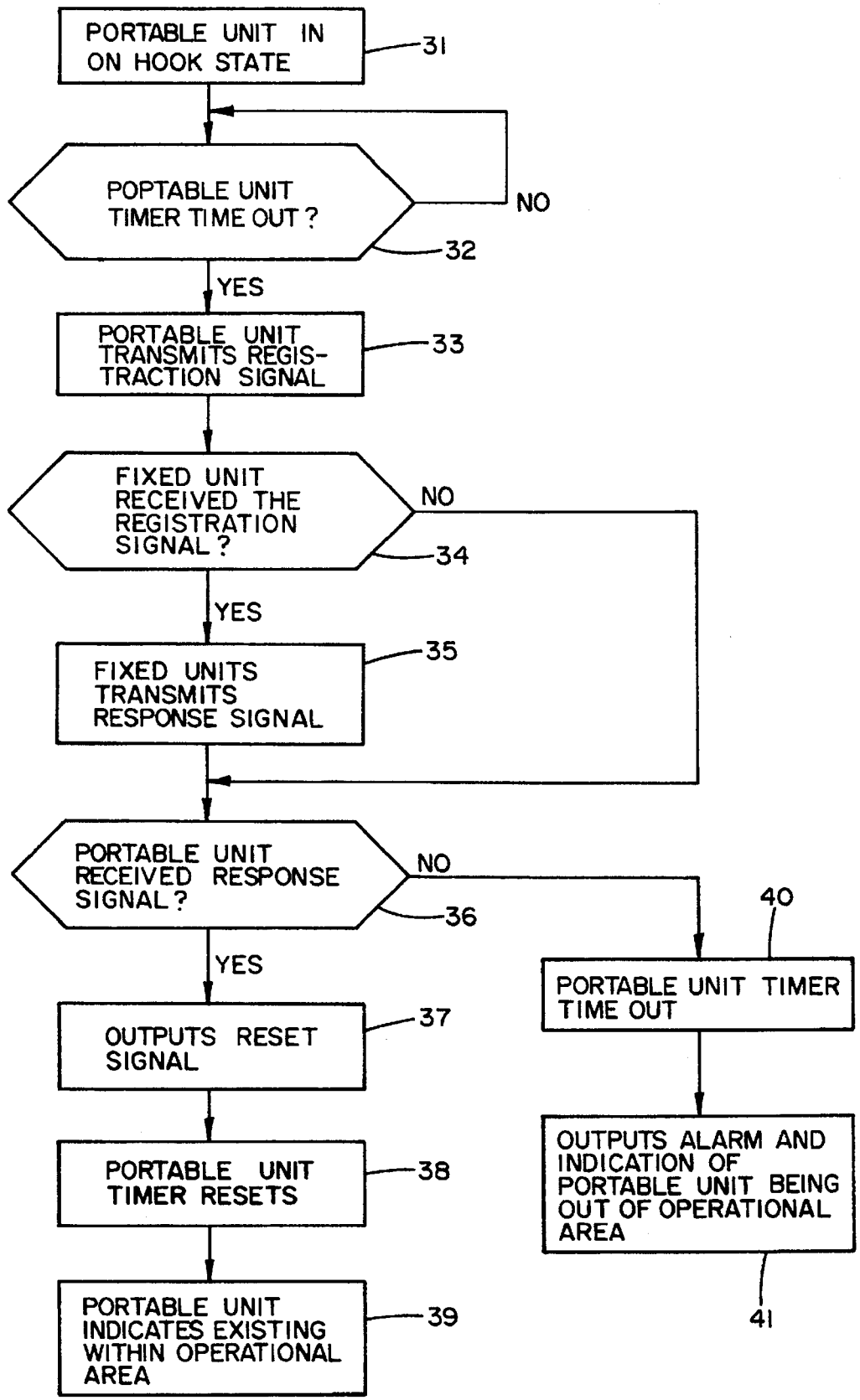
FIG. 3 is a flow chart illustrating operation of the first embodiment.

FIG. 3 is a flow chart of operation of the first embodiment.

While portable unit 2 is in a state of on hook (step 31), portable unit timer 28 counts and sets a first time when operated, and for each time-out of portable unit timer 28 (step 32), portable unit timer 28 outputs a time-out signal to portable unit control circuit 24. After the time-out signal is received, portable unit control circuit 24 controls portable unit radio section 21 to transmit a registration signal outputted from registration signal generation circuit 29 toward fixed unit 1 (step 33).

Since fixed unit 1 can receive the registration signal from portable unit 2 while portable unit 2 is within the operational area, when the signal from portable unit 2 is received through fixed unit radio section 12, fixed unit control circuit 13 determines whether or not the received signal is the registration signal (step 34). If fixed unit control circuit 13 determines that the received signal is a registration signal, then fixed unit control circuit 13 controls fixed unit radio section 12 to transmit a response signal outputted from response signal generation circuit 14 toward portable unit 2 (step 35).

Meanwhile, portable unit control circuit 24 supervises reception of a response signal by portable unit radio section 21 for a predetermined time after each transmission of the registration signal (step 36). If reception of a response signal is detected within the time, portable unit control circuit 24 sends out a reset signal to portable unit timer 28 to reset portable unit timer 28 so as to re-start counting of time by the portable unit timer 28 (step 38).

In this instance, operation area out alarm generation section 27 is not activated. In this case, it may be able to indicate by indication section 26 that portable unit 2 is within the operational area.

On the other hand, if portable unit 2 has moved out of the operational area, the registration signal transmitted from portable unit radio section 21 cannot be received by fixed unit 1 any more, and consequently, fixed unit 1 does not transmit a response signal. Accordingly, since portable unit 2 receives no response signal within the predetermined time, portable unit timer 28 is not reset but outputs a time-out signal (step 40). Portable unit control circuit 24 activates operational area out alarm generation section 27 in response to the time-out signal to generate alarming sound (step 41). Further, it simultaneously indicates by indication section 26 that portable unit 2 is out of the operational area. Consequently, even when the cordless telephone instrument is in a state of on hook, the user can acknowledge that the portable unit is out of the operational area but is available for call origination and reception of call.

A second embodiment of the present invention is described herein after.

Figure 2:
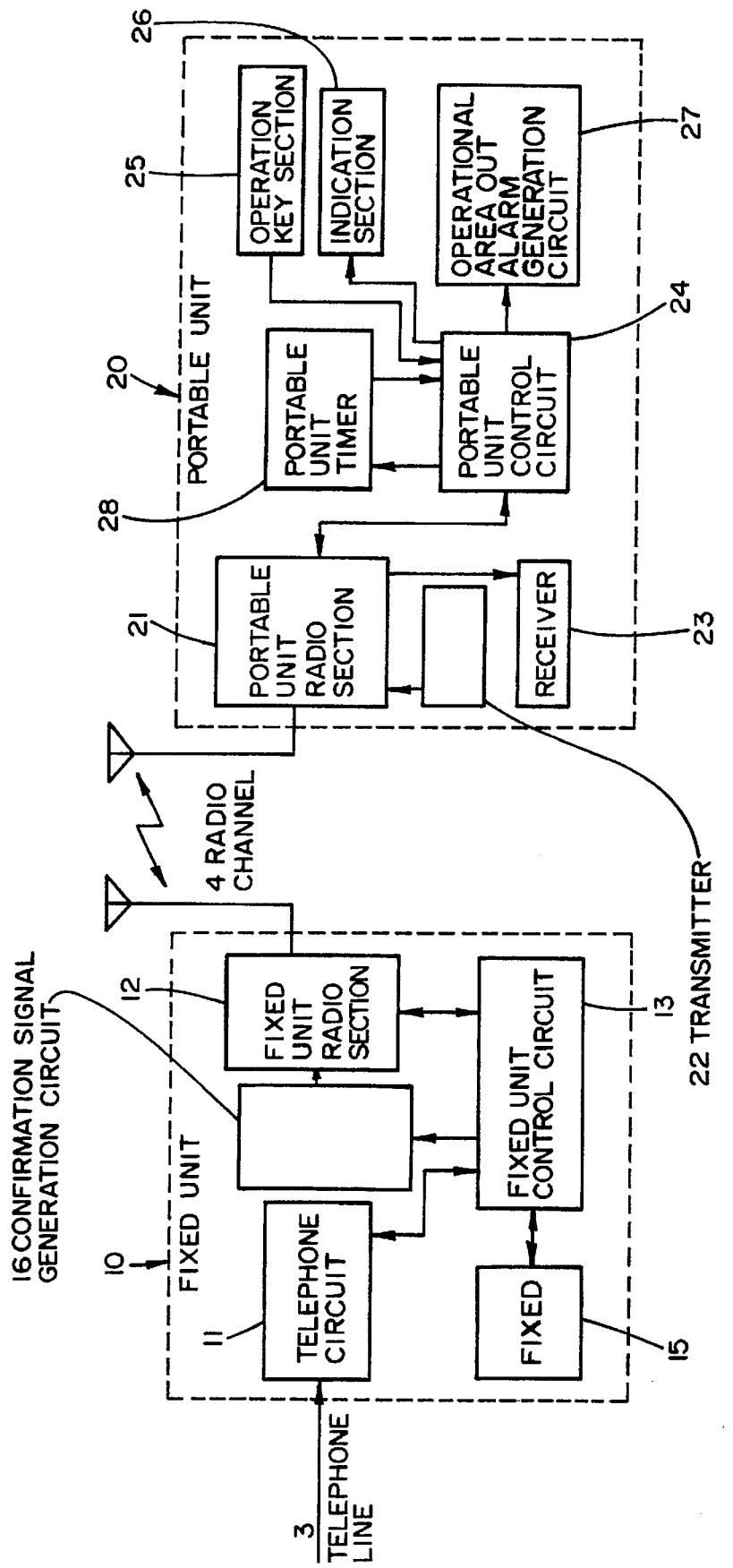
FIG. 2 is a block diagram of a second embodiment of a cordless telephone instrument of the present invention.

FIG. 2 is a block diagram of the second embodiment of a cordless telephone instrument based on the present invention.

Fixed unit 10 includes confirmation signal generation circuit 16 in place of response signal generation circuit 14 of fixed unit 1 of the first embodiment and additionally includes fixed unit timer 15. Meanwhile, portable unit 20 is different from portable unit 2 of the first embodiment only in that registration signal generation circuit 29 is not required.

Fixed unit timer 15 counts a counting time shorter than a predetermined counting time of the portable unit timer 28, and every time counting of the counting time is completed, fixed unit timer 15 outputs a time-out signal and resets itself to re-start a next time counting operation. When a time-out signal is received from fixed unit timer 15, fixed unit control circuit 13 controls fixed unit radio section 12 to transmit a confirmation signal outputted from confirmation signal generation circuit 16 to portable unit 20.

Meanwhile, if the confirmation signal is received by portable unit radio section 21, portable unit control circuit 24 of portable unit 20 resets the counted value of portable unit timer 28 and controls portable unit timer 28 to re-start a next counting operation of the predetermined counting time. However, if no confirmation signal is received, then portable unit timer 28 is not reset but outputs a time-out signal, and operational area out alarm generation section 27 is activated by the time-out signal.

Operation of the second embodiment is described below.

Figure 4:
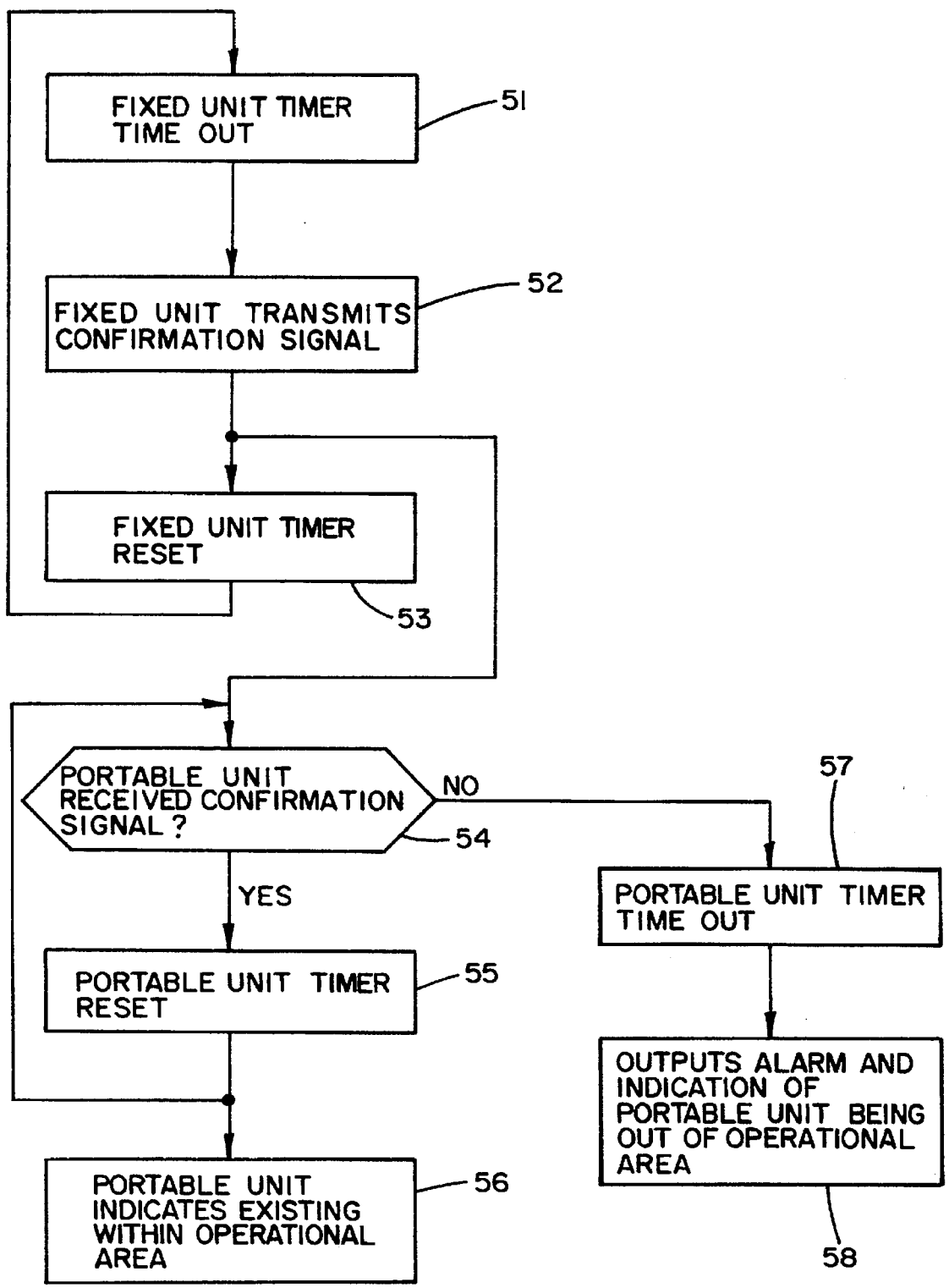
FIG. 4 is a flow chart illustrating operation of the second embodiment.

FIG. 4 is a flow chart illustrating operation of the second embodiment.

While fixed unit 10 is in a state of on hook, fixed unit timer 15 counts the predetermined time, and every time the predetermined time is counted, fixed unit timer 15 outputs a time-out signal (step 51). Every time the time-out signal is received, fixed unit control circuit 13 controls fixed unit radio section 12 to transmit a confirmation signal to unit 20 (step 52). Simultaneously when the time-out signal is outputted, fixed unit timer 15 resets itself and re-starts counting of time (step 53). Upon reception of the confirmation signal, portable unit 20 detects whether the received signal is a predetermined confirmation signal, and if it is confirmed that the received signal is a confirmation signal (step 54), portable unit timer 28 is reset and newly re-starts its counting operation (step 55).

If no confirmation signal is received and portable unit timer 28 outputs a time-out signal, then portable unit control circuit 24 activates operational area out alarm generation section 27 so that operational area out alarm generation section 27 generates alarming sound alarming that portable unit 20 has moved out of the operation area, and also controls indication section 26 to indicate that portable unit 20 has moved out of the operational area.

For a case where recognition whether or not portable unit 20 has moved out of the operational area is not required, the cordless telephone instrument may be modified so as to have a switch for switching off only the unavailable condition display apparatus portion comprising portable unit control circuit 24, indication circuit 26, operational area out alarm generation section 27, portable unit timer 28 for portable unit 20 and registration signal generation circuit 29 additionally for portable unit 2.

What is claimed is:

1. A method of indicating that a portable unit of a cordless telephone instrument which comprises a fixed unit and a portable unit is out of operational area, comprising the steps of:

starting counting of a predetermined first reference time at said portable unit, transmitting a registration signal of a first frequency peculiar to said cordless telephone instrument from said portable unit after lapse of the predetermined first reference time and starting next counting of the predetermined first reference time by said portable unit;

transmitting, upon reception of the registration signal by a fixed unit, a response signal of a second frequency peculiar to said fixed unit;

resetting, when said portable unit having transmitted the registration signal receives the response signal, the counted value of the first predetermined reference time and starting next counting of the first reference time by said portable unit; and outputting, when said portable unit receives no response signal after having transmitted the registration signal for more than a predetermined second reference time longer than the predetermined first reference time, an indication of an unavailable situation on said portable unit.

2. A method of indicating that a portable unit of a cordless telephone instrument which comprises a fixed unit and portable unit is out of operational area, comprising the steps of:

starting counting of a predetermined first reference time at said portable unit for every reset;

counting a predetermined second reference time shorter than the predetermined first reference time of a portable unit at the fixed unit, transmitting, after lapse of the predetermined second reference time, a confirmation signal of a first frequency peculiar to said cordless telephone instrument from said fixed unit toward said portable unit and resetting the counted time at said fixed unit to re-start a next counting of the predetermined second reference time;

resetting, when said portable unit receives the confirmation signal, the counting of the predetermined first reference time and starting a next counting of the predetermined first reference time; and outputting an indication of an unavailable situation on said portable unit when said portable unit counts up the predetermined first reference time and outputs a time-out signal.

3. A cordless telephone instrument which includes a fixed unit, and a portable unit connected to said fixed unit through a radio channel, comprising:

portable unit timer means provided in said portable unit for counting, every time after said portable unit timer means is reset, a predetermined first reference time and outputting a time-out signal when said portable unit timer means counts up the predetermined first reference time;

transmission and reception means provided in said portable unit for transmitting, every time the time-out signal is outputted, a registration signal of a first frequency peculiar to said cordless telephone instrument toward said fixed unit and receiving a response signal from said fixed unit;

means provided in said portable unit for resetting said portable unit timer means when the response signal is received;

means provided in said portable unit for outputting an indication of an unavailable situation on the portable unit when the response signal is not received within the predetermined first reference time; and means provided in said fixed unit for sending out, when a registration signal is received from said portable unit, a response signal of a second frequency peculiar to the subscriber toward said portable unit.

4. A cordless telephone instrument as claimed in claim 3, wherein said means for outputting an indication of an unavailable situation is an alarm generation section for outputting alarming sound.

5. A cordless telephone instrument as claimed in claim 3, wherein said means for outputting an indication of an unavailable situation is a display of an alarm indication mark.

6. A cordless telephone instrument as claimed in claim 3, wherein said means for outputting an indication of an unavailable situation is means for outputting alarming sound and a display of an indication mark simultaneously.

7. A cordless telephone instrument which includes a fixed unit, and a portable unit connected to said fixed unit through a radio channel, comprising:

portable unit timer means provided in said portable unit for counting, every time after said portable unit timer means is reset, a predetermined first reference time and outputting a time-out signal when said portable unit timer means counts up the predetermined first reference time;

reception means provided in said portable unit for resetting said portable unit timer means when a confirmation signal sent out from said fixed unit is received;

means provided in said portable unit for outputting, when the time-out signal is outputted, an indication of an unavailable condition display representing that said portable unit is in a situation away from said fixed unit;

fixed unit timer means provided in said fixed unit for counting a predetermined second reference time shorter than the predetermined first reference time of said portable unit timer means is reset every time after counting the predetermined second reference time and outputs a time-out signal; and transmission means provided in said fixed unit for transmitting a confirmation signal of a second frequency peculiar to said cordless telephone instrument toward said portable unit and resetting said fixed unit timer when the time-out signal is outputted from said fixed unit timer means.

8. A cordless telephone instrument as claimed in claim 7, wherein said means for outputting an indication of an unavailable situation display is an alarm generation section for outputting alarming sound.

9. A cordless telephone instrument as claimed in claim 7, wherein said means for outputting an indication of an unavailable situation is a display of an alarm indication mark.

10. A cordless telephone instrument as claimed in claim 7, wherein said means for outputting an indication of an unavailable situation is means for outputting alarming sound and a display of an indication mark simultaneously.

\* \* \* \* \*